United States Patent [19]

Wittstock et al.

[11] Patent Number: 5,584,991

[45] Date of Patent: Dec. 17, 1996

[54] FILTRATION SYSTEM FOR PONDS

[76] Inventors: Gary G. Wittstock, 1765 Maple Leaf Ct., Wheaton, Ill. 60187; Gregory G. Wittstock, 0S034 Pearl Rd., West Chicago, Ill. 60185

[21] Appl. No.: 381,360

[22] Filed: Jan. 31, 1995

[51] Int. Cl.$^6$ ................................................. A01K 63/04
[52] U.S. Cl. ................. 210/151; 210/169; 210/170; 210/416.2; 119/227; 119/260
[58] Field of Search ................................. 210/151, 167, 210/169, 170, 257.1, 258, 259, 261, 262, 416.2; 119/227, 259, 260

[56] References Cited

U.S. PATENT DOCUMENTS

| | | | |
|---|---|---|---|
| 4,002,566 | 1/1977 | Smith | 210/169 |
| 4,151,810 | 5/1979 | Wiggins | 210/169 |
| 4,426,286 | 1/1984 | Puckett et al. | |
| 4,606,822 | 8/1986 | D'Imperio | 210/169 |
| 4,684,462 | 8/1987 | Augustyniak | 210/169 |
| 4,818,389 | 4/1989 | Tobias et al. | |
| 4,826,591 | 5/1989 | Macia | |
| 4,915,828 | 4/1990 | Meyers et al. | 210/169 |
| 5,083,528 | 1/1992 | Strong | |
| 5,084,164 | 1/1992 | Del Rosario | 210/151 |
| 5,085,766 | 2/1992 | Born | |
| 5,171,438 | 12/1992 | Kouz | 210/169 |
| 5,228,999 | 7/1993 | Yang | 210/169 |
| 5,277,800 | 1/1994 | Dieckmann et al. | 210/169 |
| 5,288,400 | 2/1994 | Phillips | 210/169 |
| 5,306,421 | 4/1994 | Weinstein | 210/151 |

OTHER PUBLICATIONS

Art Rooze, "Water Gardens", *The Family Handyman* [New York, New York], Jun. 1990, pp. 31–39.

Stephen M. Meyer, "Murky Water", *Aquarium Fish Magazine* [Mission Viego, CA], Jun. 1991, pp. 66–67.

Stephen M. Meyer, "Algae Again", *Aquarium Fish Magazine*, [Mission Viego, CA], Jun. 1993, pp. 66–67.

"Pond Water Clarity", *Pondscapes* [Acworth, GA], May, 1994, pp. 20–21.

John Tinius, "Why is My Water Green?" and What Can I Do About It?, *KOI USA*, Jul./Aug. 1994, pp. 21–22.

Ron Beville, "One Man's Solution to Green Water", *KOI USA* [Midway City, CA], date unknown p. 26.

Stephen M. Meyer, "No–Hassle Pond Filtration", *Aquarium USA* [Irvine, CA], date unknown, pp. 53–57.

*Primary Examiner*—Christopher Upton
*Attorney, Agent, or Firm*—Welsh & Katz, Ltd.

[57] ABSTRACT

Accordingly, a filtering system for ponds is provided. The system includes a pond filtering and skimming device having defining a first internal chamber. Disposed within the chamber is a removable net disposed between the inlet and filter to entrain any objects which flow into the first chamber along with the pond water and a biological filter to filter at least a portion of any nutrients out of the pond water flowing within the first chamber. Water from the first internal chamber is preferably pumped to a bottom portion of an internal second chamber formed by a tank. The water flows upward through a second filter within the second chamber which filters at least a portion of the nutrients out of the water. The water flows upward from the filter and is discharged back into the pond from the tank to form a waterfall by flowing outward over a ledge of the tank.

23 Claims, 2 Drawing Sheets

FILTRATION SYSTEM FOR PONDS

FIELD OF THE INVENTION

The present invention generally relates to filtration systems for outdoor ponds and more particularly to a filtration system which provides a properly balanced pond habitat while maintaining water clarity, preferably without the use of chemicals and the like.

BACKGROUND OF THE INVENTION

One method of landscaping is to construct a new pond or maintain an existing pond. To obtain the maximum benefit from having such ponds, the ponds should be visually appealing and provide a habitat not only for fish but other creatures such as birds, frogs, butterflies and the like.

Clear water is a feature desired in most ponds so that fish and submerged plants may be viewable. However, maintaining the clarity of the water can become difficult. Algae, in particular free swimming algae, may cause the water to become cloudy. The excessive algae typically occurs when the water contains an excess of nutrients such as ammonia and phosphorous. This ammonia and phosphorous is generally added to pond water by fish waste and fertilizer runoff from the land surrounding the pond. Although aquatic plants may consume a portion of the nutrients, the number of plants is typically insufficient to handle the amount of excessive nutrients in a pond. Algae, which feed on these nutrients, then multiply due to the abundance of nutrients. This multiplication may result in algae "blooms" which cause the pond water to cloud up.

One method of clarifying water is to add such as chlorine chemicals to the water which destroy algae. However, these chemicals may destroy or have a serious impact on the number and growth of aquatic plants and fish. Also, chemicals tend to break down quickly requiring repetitive additions which is expensive.

An additional drawback of using the pond as landscaping is that leaves and other foliage fall onto the surface of the pond, and unless cleaned from the pond, this matter settles to the bottom. At the bottom, the leaves and foliage decompose forming a layer of sludge which may reduce the depth of the pond and also cover any underwater formations. To prevent the settling, leaves may be scooped from the surface of the pond on an almost daily basis; however, such action is labor intensive. In addition, to remove the sludge, the pond may be drained periodically. Draining, however, presents problems such as the temporary storage of fish and any possible damage to aquatic plants while the pond is dry.

It is therefore, an object of the present invention to provide an improved pond filtration system and in particular providing such an improved system which naturally balances the natural habitat in a pond so that water clarity may be maintained.

It is a further object of the present invention to provide an improved pond filtration system which may be operated with low maintenance.

It is a further object of the present invention to provide an improved pond filtration system which maintains water clarity without the use of chemicals.

It is a still further object of the present invention to provide an improved pond filtration system which removes leaves or other foliage which falls into the pond before the leaves and foliage settle to the bottom and decompose. A related object is to provide such a leaf and foliage removal system which may be operated with low maintenance.

It is a further object of the present invention to provide an improved pond filtration system which is hidden from view and may actually contribute to the attractiveness of a pond used as landscaping.

SUMMARY OF THE INVENTION

Accordingly, a filtering system for ponds is provided. The system includes a pond filtering and skimming device having an enclosure defining a first internal chamber and an inlet opening into the first chamber for water to flow into the chamber from the pond. A pump is in fluid communication with the chamber pumps the water out of the chamber thereby creating a flow of the pond water from the chamber inlet to the pump inlet. A filter is disposed within the first chamber to filter at least a portion of any nutrients out of the pond water flowing within the first chamber. The skimmer also preferably includes a removable net disposed between the inlet and filter to entrain any objects which flow into the first chamber along with the pond water.

The pump may pump the water from the skimmer back into the pond but preferably the water is pumped to a bottom portion of an internal second chamber formed by a tank. The water flows upward through a second filter within the second chamber which filters at least a portion of the nutrients out of the water. The water flows upward from the filter and is discharged back into the pond from the tank by flowing outward over a ledge of the tank to form a waterfall.

DESCRIPTION OF THE PREFERRED EMBODIMENTS

Figure 1:
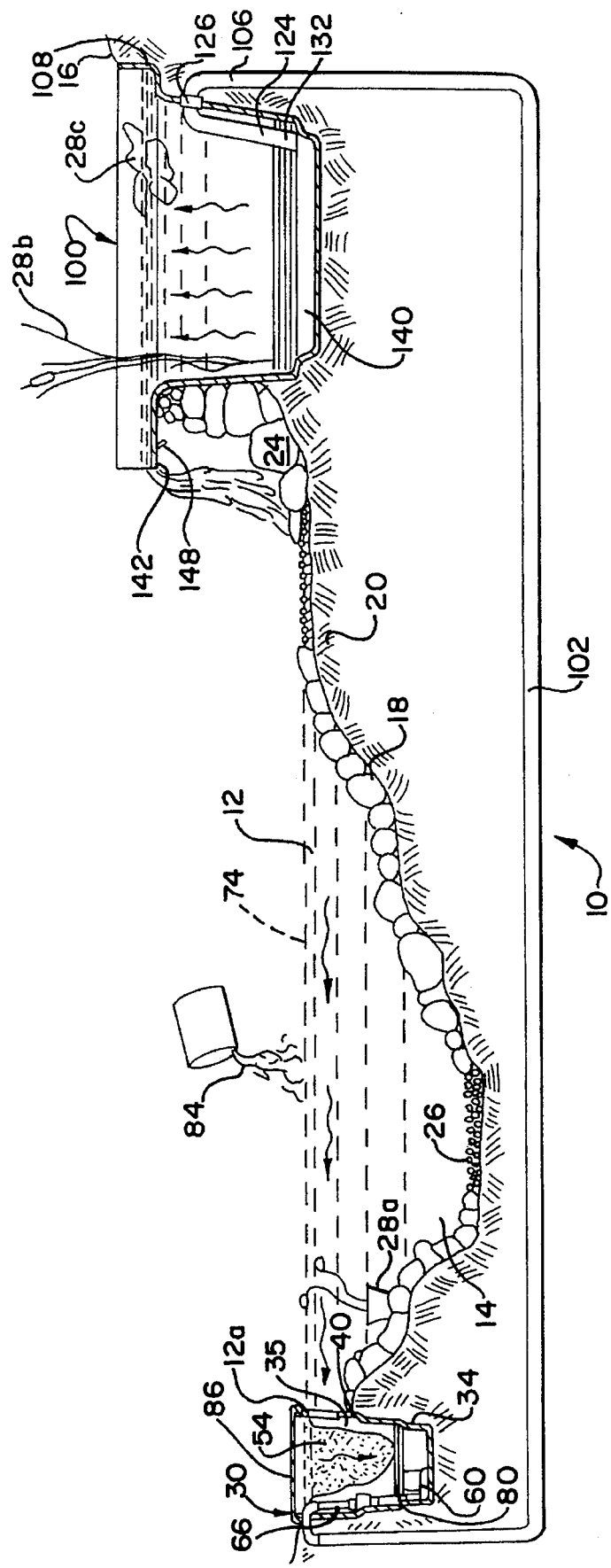
FIG. 1 is a diagrammatic side elevational view of a preferred embodiment of a filtration system for ponds.

Referring to FIG. 1, a preferred embodiment of a pond filtering system constructed in accordance with the present invention is generally indicated at 10. The system 10 is particularly suited to managing the level of algae found in a pond 12 and removing unwanted foliage and other matter which may drop onto the pond surface. The pond 12 may be constructed by the excavation of a pond bed 14 or the pond may be existing. Dirt which is excavated from the bed 14 may be used to form a berm 16 which extends along at least a portion of the periphery of the bed 14.

To retain water in the pond bed 14, the bed is preferably lined with a liner 18 particularly suited for pond water retention. Such a liner 18 may be constructed of fish safe EPDM. Concrete or other materials may also be used, although concrete liners are prone to cracking and the like. When a flexible liner 18 is used, it is preferred that the liner be placed over an underlayment 20 to protect the liner from underlying rocks or roots. The underlayment 20 may be constructed of a wide variety of soft materials such as geotextiles, newspapers, sand or the like.

Rocks 24 and river gravel 26 may be distributed along the entire surface of the liner 18. The rocks 24 serve several purposes including covering up the liner 18, holding the liner against hydrostatic pressure from a high water table and forming a means to get into and out of the pond 12. The river gravel 26 locks the rocks into place and provides surface area for the formation of a biological filter as is described below. Aquatic plants 28a, 28b and 28c may also be used to consume nutrients found in the pond water and add oxygen to the water.

Figure 2:
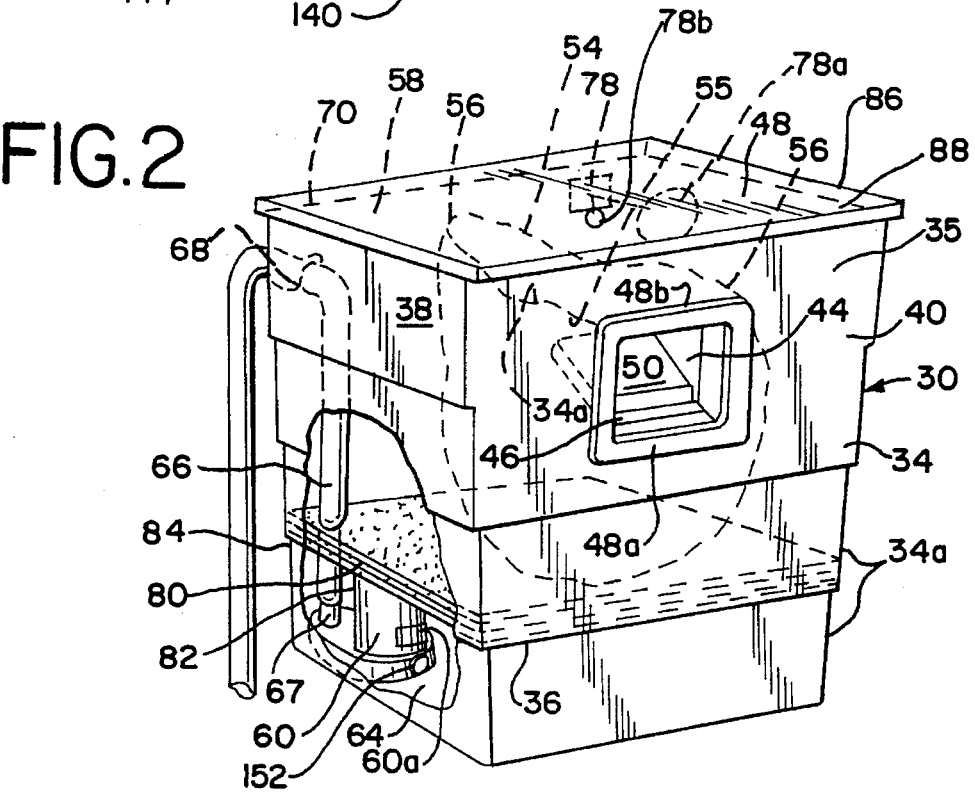
FIG. 2 is a perspective view with parts removed of a pond skimmer device forming a part of the filtration system for ponds of FIG. 1.

Referring to FIGS. 1 and 2, the filtration system 10 includes a filtering skimmer 30. The skimmer 30 includes a tub like enclosure 34 forming a filtering chamber 35 having a liquid capacity of approximately 30 gallons. The enclosure 34 preferably has a rectangular horizontal cross sectional configuration and is preferably integrally formed as a series of vertically stacked sections 34a which diminish in length and/or width from top to bottom to form a number of horizontal strengthening ribs 36. The ribs 36 strengthen sidewalls 38 of the enclosure 34 so that the enclosure can withstand burial and the freezing of the water in the enclosure during the winter. The enclosure 34 is preferably constructed of high density polyethylene (HDPE) but other materials may be suitable. Such other materials include fiberglass, which due to the strength of fiberglass may eliminate the need for the strengthening ribs 36. In addition the sidewalls 38 may be constructed with a slight draft to facilitate the stacking of multiple enclosures 34.

The enclosure 34 is buried immediately adjacent the pond so that a front sidewall 40 forms a portion of a side 12a of the pond. Formed in the front sidewall 40 is an opening or inlet 44 in which is disposed a skimmer door assembly 46. The skimmer door 46 includes a flange 48 which is attached to the front sidewall 40 and surrounds the inlet 44. Pivotally attached to a horizontal bottom edge 48a of the flange 48 is a flapper door 50. As is well known in skimmer assemblies, the flapper door 50 floats in the water so that movement of water through the inlet 44 causes a pivoting of the flapper door 50 about the bottom edge 48a of the flange 48. When water flows through the inlet 44 into the enclosure 34, the door 50 pivots to an open position to allow such flow. If the water begins to flow from the enclosure through the opening into the pond, the flapper door 50 pivots to a closed position to block this flow.

A large sack-like net 54, preferably constructed of a nylon mesh, is disposed within the enclosure 34 and arranged so that water flowing into the chamber 35 through the inlet 44 flows into an upper opening 55 of the net 54. The upper edge 54a of the net 54 is removably attached to the enclosure 34 by a series of hooks 56 which are disposed on either side of the inlet 44 and on the rear wall 58 opposite the inlet. When water is flowing into the chamber 35 through the inlet 44, leaves and other items which are floating on the surface of the water are carried through the inlet and entrained in the net 54 so that the leaves and items are removed from the pond.

To remove water from the enclosure 34 so that the water flows from the pond through the inlet 44 into the chamber 35, a pump 60 is in fluid communication with the chamber, and the pump is preferably a submerged pump located in close proximity to a generally horizontal floor 64 of the enclosure. The pump 60 creates a flow of water from the pond into the chamber 35 by pumping water in the bottom of the chamber out of the enclosure 34. Discharge piping 66 connected to a discharge 67 of the pump 60 extends upward along the rear wall 58 and turns to exit the enclosure 34 through an exit opening 68 in the rear wall. The discharge piping 66 may also extend upward and over a top edge 70 of the enclosure 34; however, this is not preferred as this may expose the discharge piping to damage, and make it more difficult to hide the exposed discharge pipe. The pump 60 may also be located outside the enclosure 34 with piping providing fluid communication between the pump and chamber 35.

The enclosure 34 is buried so that when the surface 74 of the pond is at a desired level, the pond surface 74 is at the same level as the top of the inlet 44. As the desired level of the surface 74 may range over a certain distance, the inlet 44 is sized so that as long as the pond surface is within the desired range, water and the floating leaves, etc. may flow through the opening 44 into the enclosure 34. Also, to insure that leaves and other matter which are deposited on the pond surface 74 can flow into the chamber 35 without catching on the flange 48, the enclosure 34 should be buried so that the desired lower level of the pond is a minimum of 2" above the lower edge 48a of the flange 48. In addition, the height of the inlet 44 should be sized so that the horizontal upper edge 48b of the flange 48 is equal to or higher than the desired upper level of the pond surface 74.

To remove the need to form a seal between the discharge piping 66 and the rear wall 58 of the enclosure 34 as the piping passes out of the enclosure, the exit opening 68 is preferably formed at a location higher than the desired upper level of the pond surface and upper edge 48b of the flange. It is also contemplated that a seal may be created between the piping 66 and rear wall 58 should such a seal be necessary.

To prevent a situation where the water level, for whatever reason, drops below the lower edge 48a of the flange so that water no longer flows into the chamber 34 through the inlet 44, with the pump 60 then pumping the chamber dry which may damage the pump, a float type switch and valve assembly 78 for selectively introducing water from an independent water fill source (not shown) is located within the chamber 35. Preferably the mechanical switch valve assembly 78 is disposed on the rear wall 58 and is operatively connected to the water source such as an underground irrigation pipe or underground polyethylene pipe that originates at an outdoor faucet. The switch element 78a is adjusted so that if the water level in the chamber 35 drops below a level approximately 2" above the bottom edge 48a of the flange 48, the water fill valve element 78b is mechanically opened. Alternatively, the pump 60 can be purchased or retrofit with a pressure sensitive switch 60a which deactivates the pump when the chamber 35 is pumped dry.

To filter nutrients out of the pond water after the water has flowed through the net 54 and before the water is pumped out of the chamber 35, a biological filter arrangement 80 is disposed between the net and pump 60. The biological filter 80 preferably includes at least one horizontally extending filter mat 82 which provides a large surface area for the attachment of filtering bacteria 84. Many different types of filter mats may be used in the biological filter 80, however, low density material such as nonwoven polyester/nylon blend filters manufactured by AMERICO of Acworth, Ga. have been found to be particularly efficient. The filtering bacteria 84 may be deposited on the filter mat 82 by the pouring of such bacteria directly on the mat 82. Such filtering bacteria may be obtained from several sources such as AQUA BACTA-AID from Water Quality Science International of Bolivar, Mo. and AQUA CLEAR from Aquascape Designs, Inc., of Wheaton, Ill.

The filter 80 is preferably composed of a plurality of the filter mats 82 preferably horizontally supported by the ribs 36 formed in the enclosure 34 with the mats arranged in a vertically spaced series. Each of the filter mats 82 may be 1 to 1½ inches thick.

A lid 86 is sized to cover the opening 88 formed by a top edge of the side walls 38. A lid 86 is preferably strong enough to support the weight of a person but light enough to be easily removed to allow access to the chamber 35 and net 54. The lid 86 may also be formed to appear as earth or earth mixed with rocks to contribute to the attractiveness of the pond 12.

Figure 3:
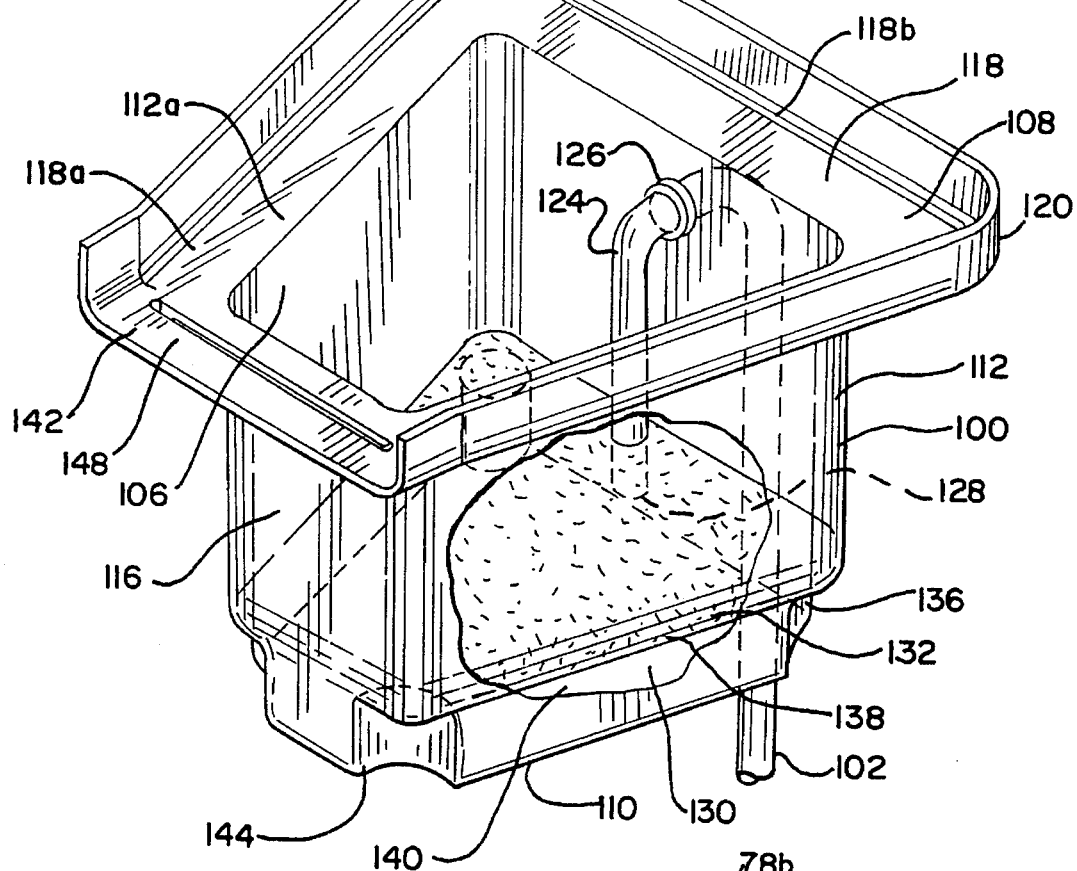
FIG. 3 is a perspective view with parts removed of a filtering tank forming a part of the filtration system for ponds of FIG. 1.

Referring to FIGS. 1 and 3, discharge from the skimmer 30 may be conveyed to the pond 12. However, in the preferred method, the discharge is conveyed to a filtering tank indicated generally at 100. Fluid communication between the tank 100 and the discharge piping 66 of the skimmer 30 is provided by a water conduit 102 which is preferably a flexible polyethylene pipe but may also be rigid piping or the like. The filtering tank 100 may be placed in close proximity to the pond 12 so that discharge from the tank flows into the pond. Optionally, the tank 100 can be positioned away from the pond's edge, and the discharge from the waterfall's lip 142 used to feed an EPDM-lined and rock filled stream. The stream is then used to guide the water back into the pond 12, oxygenating the water through additional exposure to the atmosphere and through additional water falls, depending on how the berm 16 is configured.

Preferably, the tank 100 is placed across the pond 12 from the skimmer 30 so that a current crossing the pond is formed by the flow from the tank 100 and into the skimmer 30. It is believed that such a current provides the optimal current for directing floating leaves and other items into the skimmer 30.

The filtering tank 100 includes a lower compartment 106 which is integrally attached to a peripheral rock ledge 108. The compartment 106 is formed with a lower, generally horizontal floor 110, which is integrally attached to generally vertically extending side walls 112.

The side walls 112 may be formed with a slight draft to facilitate stacking of a number of tanks 100. The side walls 112 are preferably arranged to form a frustotriangular shaped horizontal cross section. A front side wall 116, which is to be directed toward the pond 12, is the shorter of the side walls to aesthetically minimize the exposure of the tank 100 to the pond.

The ledge 108 includes a horizontal flange portion 118 which extends outward from about the periphery of an upper edge 112a of the side wall 112. A containing lip 120 to forwardly direct water being discharged from the compartment 106 extends upwards from an outer end 118a of the horizontal flange 118 around the side 118a and rear 118b sections of the flange.

The conduit 102 conveying discharged pond water from the skimmer 34 is sealing connected to a down pipe 124 by a fluid tight coupling 126 sealingly disposed in one of the side walls 112. An outlet 128 of the down pipe is positioned in a lower portion 130 of the compartment 106. Horizontally extending above the outlet 128 is a biological filtering medium 132. The filtering medium 132 is preferably filter mats 136 similar in construction to the filter mats in the skimmer 30. However, the filtering medium 132 may also be plastic bioballs, lava rock, or the like. The filtering medium 132 is supported on a horizontal extending grate 138 so that a distribution chamber 140 is formed below the filtering medium 136 with the outlet 128 of the down pipe 124 being within the distribution chamber. The grate 138 may be composed of a non-corrosive material such as plastic or fiberglass or the like and is supported above the floor 110 by scalloped indentations 144 formed at the cornered intersections of the side walls 112 and floor 110.

The tank 100 is preferably buried in the bordering berm 16 so that the side walls 112 are hidden but the lip 142 of the ledge 108 extends outward over the edge of the pond. The pond liner 18 may extend up along the front sidewall 116 to prevent leakage. Water flowing upward from the compartment 106 is directed forward by the containing lip 120 to form a waterfall into the pond which is both attractive and also adds oxygen to the pond 12. A drip shield 148 extends along a lower surface of the lip 142.

The plants 24b and 24c may be placed within the tank 100. For example, plants 24b such as cattails or water iris may be rooted directly in the filtering medium 132 particularly when gravel or lava rock is used as the medium, or the plants may be placed in containers which will likely reduce their effectiveness as the roots would be less exposed to the flowing water. Also, floating plants 24c, such as water hyacinth or water lettuce, may be used.

Referring to FIGS. 1, 2 and 3, in operation, the skimmer 30 is buried so that the front sidewall 40 forms a portion of the pond bed 12, and the tank 100 is buried adjacent the pond 12, or at the head of a stream that feeds the pond 12. The skimmer 30 is also buried so that the front inlet 44 is horizontally positioned to span the desired range of the level of the pond surface 74. Filter mats 82 are placed in a horizontal position in the skimmer 30, and filter mats 132 are placed in a horizontal position in the tank 100. Nutrient consuming bacteria 84 may then be sprinkled onto the filter mats 82 and filter mats 132. Fluid communication may then be established between the skimmer 30 and tank 100 by connecting the two with the conduit 102.

The net 54 is then removably attached to the sidewalls 38 of the skimmer 30 so that the opening 55 of the net surrounds the inlet 44. Then, the pond bed 14 is filled with water until the pond surface 74 reaches the level of the inlet 44 and water flows into the chamber 35 of the skimmer 30. The pump 60 may then be activated.

Water is sucked into an inlet 152 of the pump 60 to cause a flow of water within the chamber 35 from the inlet 44 through the net 54 and filtering arrangement 80 to the pump 60. As the water flows through the net 54, matter, such as leaves, etc. in the water is entrained in the net. As the water flows through the filtering arrangement 80, the bacteria 84 on the mats 82 consume nutrients thereby depriving algae of a food source which reduces the amount of algae. Bacteria 84 may also be added to the pond water in the pond 12 with the bacteria anchoring to the rocks 24 and gravel 26 where this bacteria also consumes excess nutrients.

In the skimmer 30 and tank 100, the rate of consumption of the nutrients by the bacteria 84 is at least partially dependent on the level of oxygen in the water flowing through the mats 82 with higher amounts of oxygen yielding better nutrient consumption. Because water at and in close proximity to the surface of the pond typically has the highest level of oxygen and the water flowing within the chamber 35 is skimmed off the top of the pond 12, the bacteria 84 is assured of being supplied with water having high oxygen levels.

In addition to entraining leaves, the flow of water into the skimmer 30 collects dust and dissolved organic compounds (DOCS) which is present in every pond from fish waste and pond debris. These DOCS may be found in the water adjacent the pond surface 74 and if not removed, may form an unsightly scum. The flow of water in the chamber 35, delivers the DOCS to the filtering arrangement 80 and/or filtering medium 132.

Water entering the pump inlet 152 is transferred by the pump 60 through the conduit 102 to the tank 100. Water entering the tank 100 flows within the distribution chamber 140 and upward through the filtering medium 132. The bacteria 84 in the filtering medium 132 consume additional amounts of nutrients, and the high oxygen levels in the water promote maximum nutrient consumption.

Water flows upward from the mats 136 of the filtering medium 132 to the upper edge 112a of the sidewalls 112 and outward over the horizontal flange 118 of the ledge 108. The containment lip 120 directs the flowing water forward over the lip 142 of the flange 118 where the water is discharged from the tank 100 to form a waterfall.

Periodically, such as weekly or monthly, depending on the season and the amount of seeds and leaves blowing into the pond 12, the lid 86 of the skimmer 30 may be removed and the net 54 temporarily removed from the chamber 35 of the skimmer 30 and the entrained matter cleaned from the net.

A specific embodiment of the novel filtration system for ponds according to the present invention has been described for the purposes of illustrating the manner in which the invention may be made and used. It should be understood that implementation of other variations, and modifications of the invention in its various aspects will be apparent to those skilled in the art, and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A filtering device for a pond having a liner adapted for pond water retention, and having pond water with a pond water surface level and material floating thereon, comprising:

an enclosure having side walls defining an internal chamber and positioned adjacent the pond with a substantial portion thereof beneath the pond water level, said enclosure having at least a pair of horizontal strengthening ribs formed by opposing side walls of said enclosure forming inwardly projecting ledges therein, and said enclosure including means for providing a pond water inlet into said chamber positioned at the pond water surface level so as to receive pond water and material floating thereon from the pond;

pump means in fluid communication with said chamber for pumping water out of the chamber and creating a flow of the water within said chamber from said pond water inlet means to a pump means inlet in fluid communication with said pump means;

filtering means within said chamber supported on said inwardly projecting ledges for filtering nutrients out of the water flowing within the chamber; and net means within said chamber disposed between said pond water inlet means and said filtering means for entraining material floating on the water in the pond swept into said chamber by the flow through said pond water inlet means.

2. The filtering device of claim 1 wherein said pump means is disposed within said chamber.

3. The filtering device of claim 1 wherein said pump means is disposed outside said chamber.

4. The filtering device of claim 1 wherein said net means is removably attached to said enclosure.

5. The filtering device of claim 1 wherein said filtering means includes filtering bacteria added and deposited directly on a substrate which is supported on said inwardly projecting ledges formed by said at least one pair of strengthening ribs formed of opposing side walls of said enclosure.

6. The filtering device of claim 5 wherein said substrate includes at least one mat supported on said inwardly projecting ledges formed by said at least one pair of strengthening ribs formed of opposing side walls of said enclosure and extending across said enclosure between said pond water inlet means and said pump means inlet.

7. The filtering device of claim 1 wherein said enclosure includes sidewalls and said pump means is disposed within said enclosure said pump means including a discharge and discharge piping connected to said discharge, said discharge piping exiting said enclosure through said sidewalls.

8. The filtering device of claim 1, said pump means pumping the water from said enclosure to a tank having a biological filter disposed within.

9. The filtering device of claim 1 wherein said enclosure includes means within said pond water inlet means for limiting flow of water from said chamber through said pond water inlet means into the pond.

10. A filtering system for ponds having pond water with a pond water surface level and material floating thereon, comprising:

an enclosure having side walls defining a first internal chamber, said enclosure including means for providing a pond water inlet into said first chamber positioned at the pond water surface level so as to receive pond water and material floating thereon from the pond, said enclosure having a at least a pair of horizontal strengthening ribs formed by opposing side walls of said enclosure forming inwardly projecting ledges therein, pump means in fluid communication with said first chamber for pumping water out of said first chamber and creating a flow of the water within said first chamber from said inlet means to an inlet in fluid communication with said pump means, first filtering means within said first chamber supported on said inwardly projecting ledges for filtering at least a portion of any nutrients out of pond water flowing within said first chamber;

a tank having an internal second chamber in fluid communication with said pump means, said pump means pumping water from said first chamber to said second chamber, and second filtering means within said second chamber for filtering at least a portion of the nutrients out of the water being pumped into said second chamber.

11. The filtering system of claim 10 wherein said first filtering means includes a first biological filter having filtering bacteria added and deposited directly on a substrate.

12. The filtering system of claim 11 wherein said second filtering means includes a second biological filter.

13. The filtering system of claim 10 wherein said tank includes a lower compartment and an outward extending ledge attached to a top edge of said compartment, said ledge having a front section configured to form a waterfall from water being discharged from said tank.

14. The filtering system of claim 13 wherein a horizontal cross section of said compartment is frustotriangular shaped.

15. The filtering system of claim 13 wherein said ledge includes a horizontal flange and a generally vertical containing lip extending about a portion of an outer end of said ledge.

16. An oxygenating waterfall filtering device for a pond having water with a pond water surface level and having pump means for pumping pond water in connection therewith, said device comprising;

an enclosure having side walls defining an internal chamber and positioned adjacent the pond with a substantial portion thereof above the pond water level, said enclosure having at least a pair of strengthening indentations formed by adjacent side walls of said enclosure forming inwardly projecting corner ledges therein, and including means for connecting said enclosure to the pump means for receiving pond water from the pump means and directing pond water into said chamber;

ledge means having a front section including a lip extending from said enclosure and positioned above the pond water surface level for directing pond water from said chamber over said lip to the pond to form an oxygenating waterfall of water being discharged from said chamber; and filtering means within said chamber supported on said inwardly protecting corner ledges for filtering nutrients out of the pond water flowing through said chamber from said means for connecting said enclosure to the pump to said ledge means.

17. The filtering device of claim 16 wherein said enclosure includes a lower compartment and said ledge means is attached to the top edge of said compartment and said lip extends outwardly from said enclosure.

18. The filtering device of claim 17 wherein said lower compartment is frustotriangular shaped in cross section.

19. The filtering device of claim 18 wherein said filtering means includes a substrate adapted to be supported on said inwardly projecting corner ledges and having filtering bacteria added to and disposed thereon.

20. The filtering device of claim 19 wherein said substrate includes at least one mat extending horizontally across said enclosure supported on said inwardly projecting corner ledges.

21. A filtering device for a pond having a liner adapted for pond water retention, and having pond water with a pond water surface level and material floating thereon, comprising:

an enclosure having side walls defining an internal chamber and positioned adjacent the pond with a substantial portion thereof beneath the pond water level, said enclosure having at least a pair of horizontal strengthening ribs formed by opposing side walls of said enclosure forming inwardly projecting ledges therein, and said enclosure including means for providing a pond water inlet into said chamber positioned at the pond water surface level so as to receive pond water and material floating thereon from the pond;

pump means in fluid communication with said chamber for pumping water out of the chamber and creating a flow of the water within said chamber from said pond water inlet means to a pump means inlet in fluid communication with said pump means; and filtering means within said chamber supported on said inwardly projecting ledges for filtering nutrients out of the water flowing within the chamber.

22. The filtering device of claim 21 wherein said filtering means includes filtering bacteria added and deposited directly on a substrate which is supported on said inwardly projecting ledges formed by said at least one pair of strengthening ribs formed of opposing side walls of said enclosure.

23. The filtering device of claim 22 wherein said substrate includes at least one mat supported on said inwardly projecting ledges formed by said at least one pair of strengthening ribs formed of opposing side walls of said enclosure and extending across said enclosure between said pond water inlet means and said pump means inlet.

* * * * *